Feb. 12, 1952     C. C. GRAVESEN     2,585,112

INJECTION MOLDING MACHINE

Filed Sept. 1, 1948     2 SHEETS—SHEET 1

INVENTOR
CARL C. GRAVESEN
BY
*Young, Emmy & Thompson*
ATT'S.

Feb. 12, 1952   C. C. GRAVESEN   2,585,112
INJECTION MOLDING MACHINE
Filed Sept. 1, 1948   2 SHEETS—SHEET 2
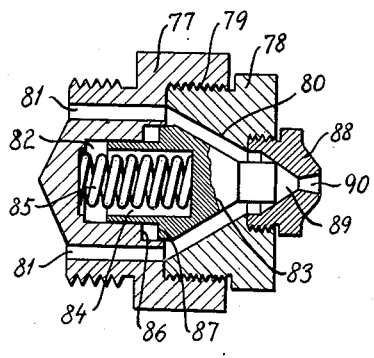
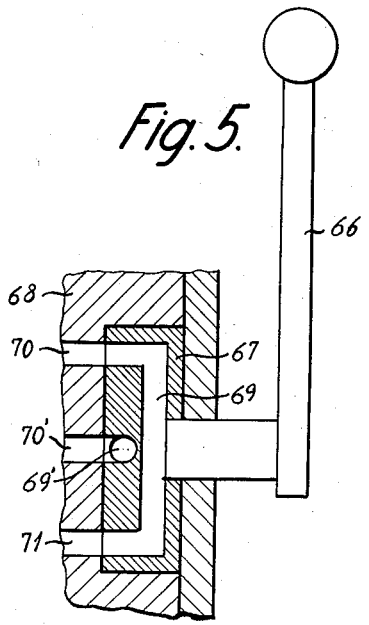
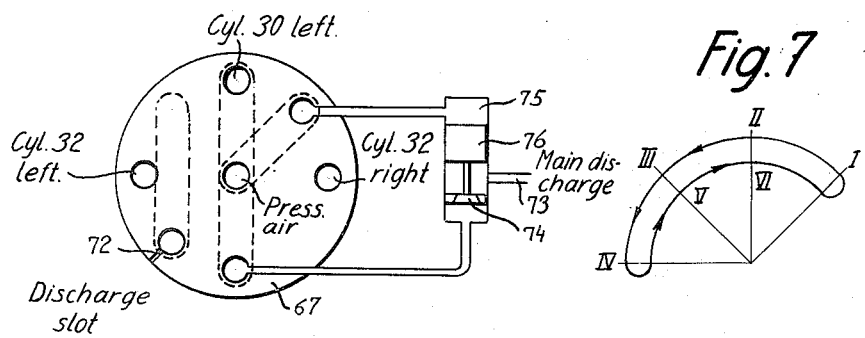
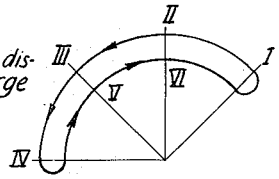
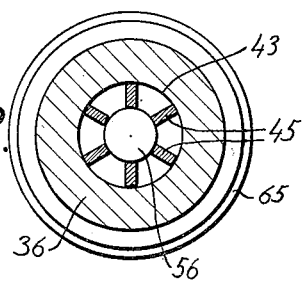
INVENTOR
CARL C. GRAVESEN Patented Feb. 12, 1952

2,585,112

UNITED STATES PATENT OFFICE 2,585,112

INJECTION MOLDING MACHINE

Carl Christian Gravesen, Copenhagen, Denmark

Application September 1, 1948, Serial No. 47,228
In Denmark September 8, 1947

9 Claims. (Cl. 18—30)

This invention relates to injection molding machines, and more particularly to machines for the injection molding of plastics.

In such machines it is customary to employ a so-called injection cylinder to which the material to be molded is fed in a granular, non-fluent state and from which it is subsequently injected through an injection nozzle integral with or associated with the injection cylinder into the mold cavity after having been heated to an injectable or fluent state while passing through the injection cylinder.

Considerable pressure is required to feed the molding material to the injection cylinder and to extrude it therefrom through the injection nozzle, and a substantial proportion of the power consumed for this purpose will be lost for overcoming frictional resistances in the mass of non-fluent material. Moreover, difficulties are frequently encountered in preventing the fluent material from spewing out from the injection nozzle when the mold is removed from the latter, which makes for untidiness and sometimes results in more or less serious disturbances in the production, especially in the case of machines designed for automatic operation. Also, in some instances, there is a danger of leakage of fluent molding material from the injection cylinder or associated parts to places where it may interfere with a proper operation of the machine.

One object of the invention is to devise an injection cylinder for machines of the character set forth, in which relatively low power is required for the feeding and injection operations while at the same time practically preventing any danger of objectionable leakage of fluent molding material. Such leakage may entail very serious drawbacks and the main object of the present invention is to avoid any place where fluid molding material can leak, while nevertheless avoiding the transmission of the injection pressure through the powdery material. In most known arrangements such transmission of the pressure with consequent losses is resorted to, and there is no leakage problem. In some known arrangements attempts have been made to avoid such transmission of the pressure through the powdery material, but in doing that they introduce a much more serious problem, viz. a leakage problem. This invention is the first to devise an injection cylinder where transmission of the injection pressure through the powdery material can be avoided without introducing a leakage problem.

A still further object of the invention is to provide simple means whereby the feeding and injection functions of an injection molding machine may be separated and mutually timed in a desirable manner.

Also among the objects of the invention is the provision of an injection molding machine in which the means for feeding molding material to the injection cylinder may be mechanically associated with the mold clamping means for common actuation.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein-disclosed invention may be made as come within the scope of the claims.

The accompanying drawings illustrate one example of the physical embodiment of the invention constructed in accordance with the best modes so far devised for the practical application of the principles thereof, and in which Figure 1 is a side elevation of an injection molding machine constructed in accordance with the invention, the view being somewhat diagrammatical, and some parts being omitted or broken away;

Figure 4 is a longitudinal section on a still larger scale of an alternative form of an injection nozzle;

Figure 5 is a diagrammatical illustration of a control valve that may be used with the machine;

Figures 6 and 7 are diagrams illustrating the function of a control valve as shown in Figure 5 to control the various phases of the operation of a machine and injection cylinder and nozzle as illustrated in Figures 1–4; and Fig. 8 is a cross sectional view showing the ribs and taken on a line between the lines C and D of Fig. 3.

Figure 1:
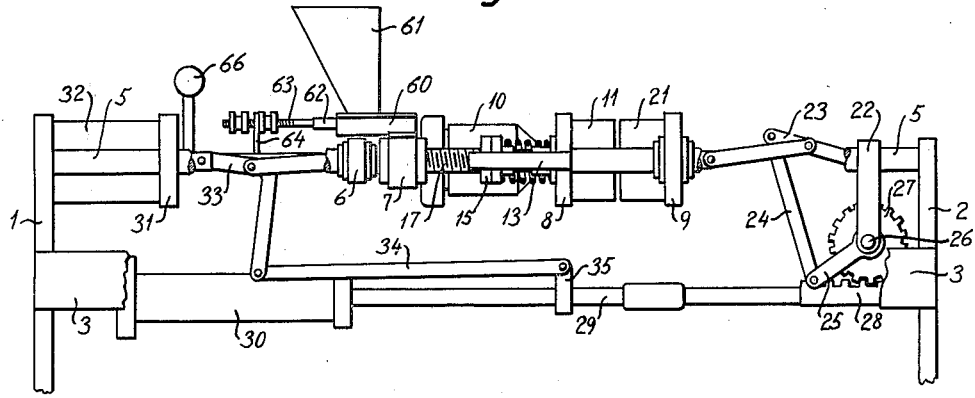
Figure 2:
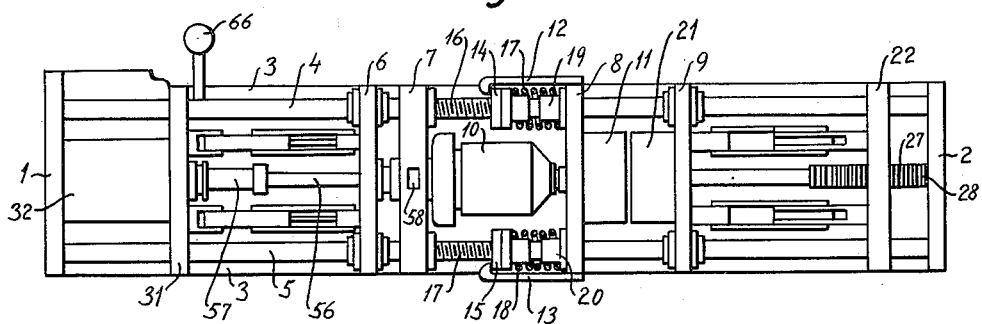
Figure 2 is a similar plan view of the machine.

Referring now to the drawings and more particularly to Figures 1 and 2, there is shown an injection molding machine having a frame illustrated by vertical end members 1 and 2 and horizontal members 3. Extending between the two vertical members 1 and 2 are two horizontal cylindrical guide rods 4 and 5, and mounted on the latter are a number of crossbars 6, 7, 8 and 9. The crossbar 6 is mounted for slidable movement in the longitudinal direction of the machine along the guide rods 4 and 5. The crossbar 7 is secured to the guide rods 4 and 5 in a fixed position and carries the injection nozzle 10 of the machine. The crossbar 8 serves as a support for one of the mold halves 11 and is slidably mounted on the guide rods 4 and 5, but its slidability is limited in the right hand direction by means of hooks 12 and 13 engaging behind pairs of nuts 14 and 15 screwed on to threaded portions 16 and 17 respectively of the guide rods 4 and 5. A coil spring 17, 18 is inserted between each pair of nuts 14, 15 and a sleeve 19, 20 associated with the crossbar 8 so as to urge this crossbar in the right hand direction. It will be understood that the crossbar 8 is held by means of the hooks 12 and 13 in ordinary manner in such a position that the inlet passage of the mold half 11 attached thereto is situated at a small distance in front of the nozzle of the injection cylinder 10 in readiness to be pressed against the nozzle by movement of the crossbar 8 to the left against the action of the coil springs 17 and 18 upon closing of the mold.

The crossbar 9 serves as a support for the second mold half 21 and is mounted for slidable movement along the guide rods 4 and 5. Attached between the crossbar 9 and a fixed support 22 mounted on and depending from the guide rods 4 and 5 is a toggle mechanism 23 coupled by means of a pair of links 24 to a pair of arms 25 secured to a shaft 26 mounted in the support 22 and carrying a gear 27. The latter meshes with a rack 28 which is mounted for slidable movement in the longitudinal direction of the machine and is fixed to the end of a piston rod 29 extending from a pressure cylinder 30 mounted on the frame of the machine. Attached between the crossbar 6 and a fixed vertical wall 31 integral with the end wall of a pressure cylinder 32 mounted on the frame of the machine is a toggle mechanism 33 coupled by means of a pair of links 34 to an upstanding arm or plate 35 secured to the piston rod 29.

Figure 3:
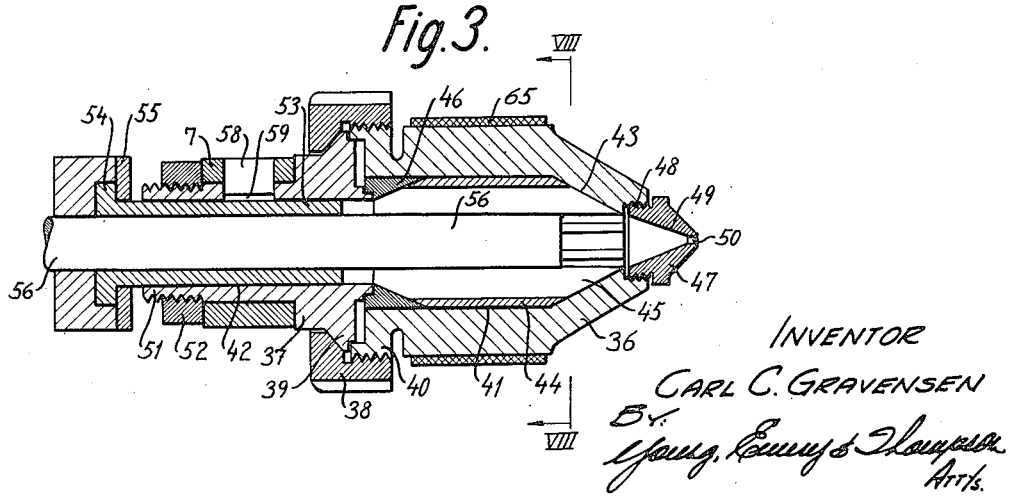
Figure 3 is a longitudinal section on a larger scale of the injection cylinder of the machine, including an injection nozzle associated therewith.

Reference will now be had more particularly to Figure 3, which shows a preferred construction of an injection cylinder for use in my injection molding machine. In the embodiment shown, the injection cylinder is composed of a front member 36 and a rear member 37 held together by means of a nut 38 engaging behind a collar 39 of the rear member 37 and screwed on to a threaded portion 40 of the front member 36. The front and rear members 36 and 37 have aligned cylindrical bores 41 and 42 respectively, the cylindrical bore 41 of the front member 36 having a larger diameter than the cylindrical bore 42 of the rear member 37 and terminating at its front end in a conical bore portion 43. Fitted in the bore 41 and in contact with the wall thereof is a sleeve 44 provided with radially inwards projecting ribs 45, and a ring member 46 of substantially triangular cross section clamped between the sleeve 44 and the front surface of the rear member 37. At its right hand end the front member 36 of the injection cylinder is provided with a nozzle 47 which is screwed into an internally threaded recess 48 at the front end of the front member 36. The nozzle 47 has a conical bore 49 which forms an extension of the conical portion 43 of the bore of the front member 36 and terminates in an outlet opening 50. Thus it will be seen that the complete cavity of the injection cylinder is formed by the cylindrical bore 42 of the member 37, the spaces in the member 36 defined by the ring member 46, the sleeve 44, the wall of the conical bore portion 43, and the ribs 45, and finally the conical bore 49 of the injection nozzle 47. The inclined face of the ring member 46 forms a smooth transition from the narrower portion of the cavity in the member 37 to the larger portion of the cavity in the member 36.

The rear member 37 of the injection cylinder extends through a hole in the crossbar 7 and is provided at its rear end with a screw-threaded portion 51 on to which is screwed a nut 52 by means of which the injection cylinder is clamped to the crossbar 7.

Slidably mounted within the bore 42 of the rear member 37 of the injection cylinder is a hollow plunger 53 provided at its extending rear end with a collar 54 which is anchored in a recess of the crossbar 6 by means of a locking plate or disc 55. A second plunger 56 is slidably mounted in the bore of the hollow plunger 53 and extends into the bore 41 of the front member 36 where the ribs 45 are in contact with the plunger 56 and form a further guide therefor. At its rear end, the plunger 56 extends through a hole of the crossbar 6 and is attached to a piston rod 57 extending from the pressure cylinder 32, see Figure 2.

The crossbar 7 and the rear member 37 of the injection cylinder are provided with aligned holes 58, 59 of substantially rectangular configuration for admitting molding material into the bore 42 of the rear member 37 in front of the plunger 53 in one position thereof. The hole 59 is also shown in Figure 2. Attached to the crossbar 7 above this hole, but omitted in Figures 2 and 3, is a box-like structure 60 to the top of which a feeding hopper 61 is attached, see Figure 1. A slide 62 is mounted for longitudinal movement in the box-like structure 60, and to the rear end of the slide 62 is pivoted a push rod 63 extending through a hole of an upstanding arm 64 attached to the piston rod 57. The portion of the push rod 63 extending through the upstanding arm 64 is threaded, and adjusting screws are mounted on the threaded portion on both sides of the arm 64, whereby the amount of lost motion and thereby the stroke of the slide 62 may be adjusted. In each stroke of the piston rod 57 the slide 62 will thus feed an adjusted portion of molding material from the feeding hopper 61 to the hole 58 through which the material will subsequently fall by gravity into the bore of the rear member 37 of the injection cylinder.

Around the front member 36 of the injection cylinder is secured a heating element 65 such as an electric resistance heating element, although other types of heating such as electric induction heating or fluid heating may be used, if desired.

A handle for controlling the operation of the pressure cylinders 30 and 32 is indicated at 66 in Figures 1 and 2, an one form of a valve mechanism that may be used in the case of pneumatic control of the pressure cylinders 30 and 32 is diagrammatically illustrated in Figure 5. This valve mechanism comprises a cylindrical valve member 67 which is rotatably mounted in a cylindrical recess of a body 68 forming part of or associated with the frame of the machine. The cylindrical valve member 67 is provided with a number of passages as shown at 69, 69' opening at the inner face thereof, and the body 68 is provided with a number of passages as indicated at 70, 70', 71 opening in the bottom of the recess of the body 68 in contact with the said inner face of the cylindrical valve member 67. The cylindrical valve member 67 may be rotated to a number of different positions by means of the handle 66 either manually or automatically.

Figure 6 is a diagram indicating the connections of the various passages in the body 68 and also indicating the paths of the passages 69, 69. The passages of the body 68 are indicated by full drawn circles, and the passages of the valve member 67 are indicated by dotted lines. It will be seen that the passages in the body 68 are connected as follows: central passage to pressure air source; passage at top to left hand side of cylinder 30; passage in the horizontal center line left to the left hand end of the cylinder 32; passage in the horizontal center line right to the right hand end of the cylinder 32; passage at 45° downwards left to a narrow discharge slot as diagrammatically indicated at 72; passage at the bottom to a main discharge pipe 73 through a non-return valve 74; and passage at 45° upwards right to a chamber 75 above a piston 76 associated with the non-return valve 74. The right hand ends of both cylinders 30 and 32 are permanently connected to a source of constant pressure lower than the full actuating pressure available through the central passage in the body 68.

The diagram in Figure 7 shows the various positions of the handle 66 during an operating cycle. The position I of the handle 66 corresponds to the position of the passages of the valve member 67 indicated by dotted lines in Figure 6.

The operation is as follows:

At the beginning of a cycle, the front end of the plunger 53 is in a position, say as indicated at A, somewhat to the rear of the holes 58 and 59, while the front end of the plunger 56 is in a position somewhere between those indicated at C and D, depending on the amount of molding material injected in each cycle. The handle 66 is in the position I. In this position, the left hand end of the cylinder 30 is connected to the main discharge through the non-return valve 74 which is opened by means of pressure air penetrating from the central passage of the body 68 to the passage at 45° upwards right and from there to the chamber 75 above the piston 76.

When the handle 66 is now turned to position II, pressure air is admitted from the pressure air source to the left hand end of the cylinder 30, and at the same time the left hand end of the cylinder 32 is connected to the main discharge through the non-return valve 74 which remains open. Accordingly, the piston rod 29 is pushed to the right, and thereby the crossbar 9 is pushed to the left by way of the gear 27, the pair of arms 25, the pair of links 24 and the toggle mechanism 23. By the movement of the crossbar 9 in the left hand direction, the mold parts 21 and 11 are clamped together and are thereafter moved jointly through a small distance to the left against the action of the coil springs 17 and 18 to bring the inlet opening of the mould part 11 into contact with the nozzle of the injection cylinder in well known manner. At the same time, the crossbar 6 is moved to the right by way of the link 34 and the toggle mechanism 33 whereby the plunger 53 is moved to the right, say to position B, to feed molding material received through the holes 58 and 59 into the injection cylinder. Also, at the same time, the plunger 56 is withdrawn to position C because the left hand side of the operating cylinder 32 thereof is connected to the main discharge.

In position III of the handle 66, the right hand and left hand ends of the cylinder 32 are connected to each other, but this is of no effect at the present stage.

In position IV, the left hand end of the cylinder 32 is connected to the pressure air source, and accordingly, the piston rod 57 and the plunger 56 are pushed to the right whereby molding material is extruded from the injection cylinder and injected into the mold cavity. At the same time, the right hand end of the cylinder 32 is connected to the space below the non-return valve 74, but since at the same time the chamber 75 above the piston 76 is connected to the discharge slot 72, the non-return valve 74 will be closed as soon as the air has escaped from the chamber 75.

In position V of the handle 66, the right hand and left hand ends of the cylinder 62 are again connected with each other. This has the effect that the plunger 56 is relieved of any operating pressure and is free to yield back under the influence of the pressure prevailing in the injection cylinder.

Finally, position VI of the handle 66 is a status quo position in which the handle is left while the molding material injected into the mold cavity is being cooled. No changes in the positions of the various parts take place in this position of the handle. The left hand end of the cylinder 30 is connected to the pressure air source, but this is of no effect since the piston rod 29 is already in its rightmost position, and both toggle mechanisms 23 and 33 are in their stretched positions. The left hand end of the cylinder 32 is connected to the space below the non-return valve 74, but this is of no effect since the non-return valve 74 was closed in position IV.

When the handle is again moved to position I, the left hand end of the cylinder 30 is connected to the main discharge through the non-return valve 74 which is again opened as previously described, and accordingly, the piston rod 29 is pulled to the left opening both toggle mechanisms 33 and 23 and thereby withdrawing the plunger 53 to position A and opening the mold.

It will be noted from the above that in the injection cylinder described, the functions of feeding molding material into the injection cylinder and extruding molding material therefrom have been separated, the feeding being effected by means of the plunger 53, hereinafter referred to as the feeding plunger, and the extrusion of the molding material from the injection cylinder in the injection step being effected by means of the plunger 56, hereinafter referred to as the injection plunger. In injection cylinders of conventional design it is customary to employ a single plunger which feeds granular molding material into one end of the injection cylinder and thereby at the same time extrudes fluent molding material from the other end of the injection cylinder. This has the drawback that the injection pressure is to be transmitted through the mass of granular molding material to the zone of the injection cylinder where molding material is present in a fluid state whereby considerable power is consumed in overcoming frictional forces in the granular material. This again means that the single plunger must be operated at a very high pressure to ensure a sufficiently high injection pressure notwithstanding the drop in pressure occurring in the transmission thereof through the granular material. In the present instance, on the other hand, the injection pressure is not derived from the hollow feeding plunger, and the latter can therefore be operated at a relatively low pressure especially where the injection plunger is withdrawn to provide space in the cavity of the injection cylinder for feeding molding material thereto. While it is preferred to arrange for the injection plunger to be withdrawn simultaneously with the feeding stroke of the feeding plunger as described, the return stroke of the injection plunger might alternatively be initiated or completed before the commencement of the forward stroke of the feeding plunger, although in some cases this might lead to difficulties arising from air being sucked into the cavity of the injection cylinder through the nozzle thereof.

Also the pressure at which the injection plunger is operated may be selected lower than the pressure employed in the case of a single plunger, because the injection plunger acts directly in the fluid mass of molten material, it being understood that under the influence of the heating element 65, the molding material is gradually heated to an injectable state while passing through the cavity of the injection cylinder so that this cavity will be divided into a non-fluent material zone adjacent the inlet end of the cavity and a fluent material zone adjacent the outlet end thereof.

It is also to be noted that since the injection plunger extends through the non-fluent material zone of the cavity of the injection cylinder into the fluent material zone thereof, the provision of this additional plunger does not result in any danger of leakage or any additional tightening problem such as would be the case if the injection plunger were arranged to penetrate directly from the outside into the fluent material zone.

Another advantage obtained by separating the feeding and injection functions as described is that the injection can be commenced immediately upon closing the mold without having to wait for an initial feeding motion.

From the above explanation it will be understood that after the injection has taken place, the injection plunger is relieved of the operating pressure so that it will be free to move under the influence of forces acting in the cavity of the injection cylinder. Accordingly, the injection plunger will be pushed a small distance backwards under the influence of the pressure prevailing in the cavity of the injection cylinder whereby the said pressure is reduced to a value in the neighbourhood of the atmospheric pressure. Here again, if there were only a single plunger, even if the latter were relieved of its operating pressure, this plunger would be less inclined to yield under the influence of the pressure prevailing in the outlet zone of the cavity of the injection cylinder, because this pressure would have to be transmitted through the highly compacted mass of granular molding material in the inlet zone of said cavity. In other words, when the mold is subsequently removed from the injection cylinder, there will be considerably less tendency to objectional spewing with the injection cylinder according to the invention than with an injection cylinder having a single plunger.

As above stated, the heating of the molding material in the cavity of the injection cylinder is effected by means of a heating element 65 arranged outside the injection cylinder. This means that the heat penetrates into the molding material mainly from the outside, but owing to the contact of the ribs 45 with the injection plunger 56 heat will also be transferred through a metallic conductive path to the latter and thence to the molding material from the inside. This makes for a more uniform heating of the molding material.

Figure 4 shows an alternative form of an injection nozzle that may be used in combination with the injection cylinder shown in Figure 3. The injection nozzle of Figure 4 consists of two parts 77 and 78, which are screwed together by mutually engaging screw-threads indicated at 79. The part 78 has a conical bore 80, and the part 77 is provided with axial passages 81 communicating with the conical bore 80. The part 77 has a cylindrical cavity 82 facing the conical bore 80 in which cavity a valve member 83 is slidably mounted. The valve member 83 has a cavity 84 facing the cavity 82, and a biasing spring 85 is inserted in the two cavities so as to urge the valve member 83 in a forward direction. The rearward movement of the valve member 83 is limited by radial shoulder surfaces 86 and 87 of the part 77 and the valve member 83 respectively. A cap 88 is screwed into the part 78 and has a conical cavity 89 forming a valve seat for the valve member 83 and terminating in an outlet aperture 90 through which the molding material is extruded. When the nozzle of Figure 4 is used in conjunction with the injection cylinder of Figure 3, the valve formed by the valve member 83 and the seat 89 will remain closed under the influence of the biasing spring 85 until the pressure adjacent the outlet end of the injection cylinder rises to a certain value, and will then be opened against the force of the biasing spring by the pressure of the molten material acting on the free surface of the valve member 83 lying in the conical bore 80. When the injection plunger is relieved of its operating pressure and the pressure in the outlet zone of the injection cylinder is accordingly reduced, the valve member 83 will again be pressed against its seat to close the outlet from the injection nozzle so as to avoid undesirable spewing. Here again it should be noted that a nozzle as shown in Figure 4 would not give the same advantages if used in conjunction with an injection cylinder having a single plunger, the fact being that in the case of the injection cylinder according to the invention, an easy internal escape for the fluid material adjacent the valve into the injection cylinder proper is established by the action of the returning or yielding injection plunger to facilitate closing of the valve, while in the case of an injection cylinder having a single plunger, at least part of the material adjacent the valve would have to escape through the outlet opening in the form of spewing before the pressure is reduced sufficiently to permit the valve to close.

While I have herein shown and described only specific forms of my invention, it will be understood that changes might be made in the form and arrangement of the parts to suit the particular adaptation without departing from the spirit and scope of my invention, and hence I do not wish to be limited thereto except for such limitations as the claims may import.

I claim:

1. An injection cylinder for injection molding machines comprising walls forming a cavity having an inlet zone and an outlet zone in constant communication therewith, means effective in said inlet zone for feeding molding material thereto and means extending through said inlet zone into said outlet zone in permanently spaced relationship to the walls thereof and effective in said last-named zone for extruding molding material therefrom.

2. An injection cylinder for injection molding machines comprising walls forming a cavity having an inlet zone and an outlet zone in constant communication therewith, reciprocating means effective in said inlet zone for feeding molding material thereto and reciprocating means extending through said inlet zone into said outlet zone in permanently spaced relationship to the walls thereof and effective in said last-named zone for extruding molding material therefrom.

3. An injection cylinder for injection molding machines comprising walls forming a cavity having an inlet zone and an outlet zone in constant communication therewith, a feeding plunger effective in said inlet zone for feeding molding material thereto and an injection plunger extending through said inlet zone into said outlet zone in permanently spaced relationship to the walls thereof and effective in said last-named zone for extruding molding material therefrom.

4. An injection cylinder for injection molding machines comprising walls forming a cavity, a feeding plunger for feeding non-fluent molding material into said cavity, means for gradually heating molding material passing through said cavity to an injectable state to form in said cavity a non-fluent material zone and a fluent material zone, and an injection plunger extending through said non-fluent material zone into said fluent material zone for extruding fluent material therefrom and having its circumferential surface permanently spaced from the walls forming said cavity.

5. An injection cylinder for injection moulding machines, comprising a chamber into which the moulding material is fed, an outer annular piston for feeding the material into the chamber, and an inner piston slidable in the bore of the annular piston to extrude the material from the chamber, the chamber being provided over the entire length of the stroke of the inner piston and having a cross-sectional area so much larger than that of the inner piston that in all phases of the operation the chamber forms a unit with free communication between the zone in front of and the zone behind the front end of the inner piston.

6. In injection molding machines, an injection chamber comprising walls forming a cavity having an inlet zone and an outlet zone in constant communication therewith, a feeding plunger for feeding molding material to said inlet zone, an injection plunger extending through said inlet zone into said outlet zone in permanently spaced relationship to the walls thereof for extruding molding material therefrom, and means for advancing said feeding plunger and simultaneously withdrawing said injection plunger, subsequently advancing said injection plunger, and subsequently withdrawing said feeding plunger and having its circumferential surface permanently spaced from the walls forming said cavity.

7. In injection molding machines, an injection chamber comprising walls forming a cavity having an inlet zone and an outlet zone in constant communication therewith, a feeding plunger for feeding molding material to said inlet zone, an injection plunger extending through said inlet zone into said outlet zone in permanently spaced relationship to the walls thereof for extruding molding material therefrom, mold clamping means, a toggle-mechanism for driving said feeding plunger, said toggle mechanism being operatively associated with said mold clamping means, and driving means for said injection plunger.

8. In injection molding machines, an injection chamber comprising walls forming a cavity having an inlet zone and an outlet zone in constant communication therewith, a feeding plunger for feeding molding material to said inlet zone, an injection plunger extending through said inlet zone into said outlet zone in permanently spaced relationship to the walls thereof for extruding molding material therefrom, driving means for said feeding plunger, driving means for said injection plunger, and portioning means for feeding a portion of molding material in front of said feeding plunger in the withdrawn position thereof, said portioning means being operatively associated with said driving means for said injection plunger.

9. In injection molding machines, in combination, an injection cylinder having a cavity including a cylindrical portion at the rear end of said cavity and terminating in an outlet at the front end thereof, a hollow feeding plunger mounted in said cylindrical portion of said cavity for slidable movement between a rearmost position and a foremost position, the wall of said cylindrical cavity portion being provided with an inlet opening in a position in front of the location of the front end of said feeding plunger in the rearmost position thereof, and an injection plunger slidably mounted in the bore of said feeding plunger and extending into the portion of said cavity in front of said feeding plunger, a first pressure operated cylinder, a toggle mechanism for advancing and returning said feeding plunger connected to said first pressure operated cylinder for operation thereby, mold closing means, a toggle mechanism for actuating said mold closing means connected to said first pressure operated cylinder for operation thereby, a second pressure operated cylinder for advancing and returning said injection plunger, and control means for said pressure operated cylinders to cause the following movements of said feeding and injection plungers and said mold closing means in the order mentioned, first, advancing of the feeding plunger, return of the injection plunger and closing of the mold, second, advancing of the injection plunger, third, release of the injection plunger, and fourth, return of the feeding plunger and opening of the mold.

CARL CHRISTIAN GRAVESEN.

REFERENCES CITED

The following references are of record in the file of this patent:

UNITED STATES PATENTS

| Number | Name | Date |
|---|---|---|
| 2,057,945 | Gastrow | Oct. 20, 1936 |
| 2,107,190 | Shaw | Feb. 1, 1938 |
| 2,233,354 | Thilenius | Feb. 25, 1941 |
| 2,269,388 | Weida | Jan. 6, 1942 |
| 2,353,276 | Stewart | July 11, 1944 |
| 2,359,839 | Goessling | Oct. 10, 1944 |
| 2,454,661 | Lester et al. | Nov. 23, 1948 |

FOREIGN PATENTS

| Number | Country | Date |
|---|---|---|
| 498,653 | Great Britain | Jan. 11, 1939 |
| 501,277 | Great Britain | Feb. 21, 1939 |